United States Patent [19]
Hastings et al.

[11] 3,803,610
[45] Apr. 9, 1974

[54] ISO-PHASE NAVIGATION SYSTEM
[75] Inventors: Charles E. Hastings, Newport News; William A. Rounion, Tabb, both of Va.
[73] Assignee: Teledyne, Inc., Los Angeles, Calif.
[22] Filed: May 26, 1971
[21] Appl. No.: 147,266

Related U.S. Application Data
[63] Continuation-in-part of Ser. No. 887,608, Dec. 23, 1969, abandoned, which is a continuation-in-part of Ser. No. 847,537, Aug. 1, 1969, abandoned.

[52] U.S. Cl. ..... 343/105 R, 343/105 H, 343/105 LS
[51] Int. Cl. .............................................. G01s 1/30
[58] Field of Search ...... 343/105 R, 105 LS, 105 H, 343/114.5

[56] References Cited
UNITED STATES PATENTS
3,715,758  2/1973  Sender ............................ 343/105 R Primary Examiner—Maynard R. Wilbur
Assistant Examiner—S. C. Buczinski
Attorney, Agent, or Firm—Ronald W. Reagin

[57] ABSTRACT

An Omega navigation system is disclosed which includes a relay station at a fixed location. The relay station includes a receiver for receiving the signals being braodcast by the Omega transmitting stations and an arrangement for determining the phases of the signals thus received. The relay station also includes a transmitter for broadcasting a signal indicative of the phase of the signals as received at the relay station. The mobile station in the system is provided with a first receiver for receiving the signals broadcast by the Omega transmitting stations, in a conventional manner, and a second receiver for receiving the signals broadcast by the relay station. The mobile station also includes means for determining the phase of the signals received by its first receiver relative to the phase of the signals received by its second receiver, and thereby determine its position relative to the Omega transmitting stations, independent of its distance from the relay station.

8 Claims, 5 Drawing Figures

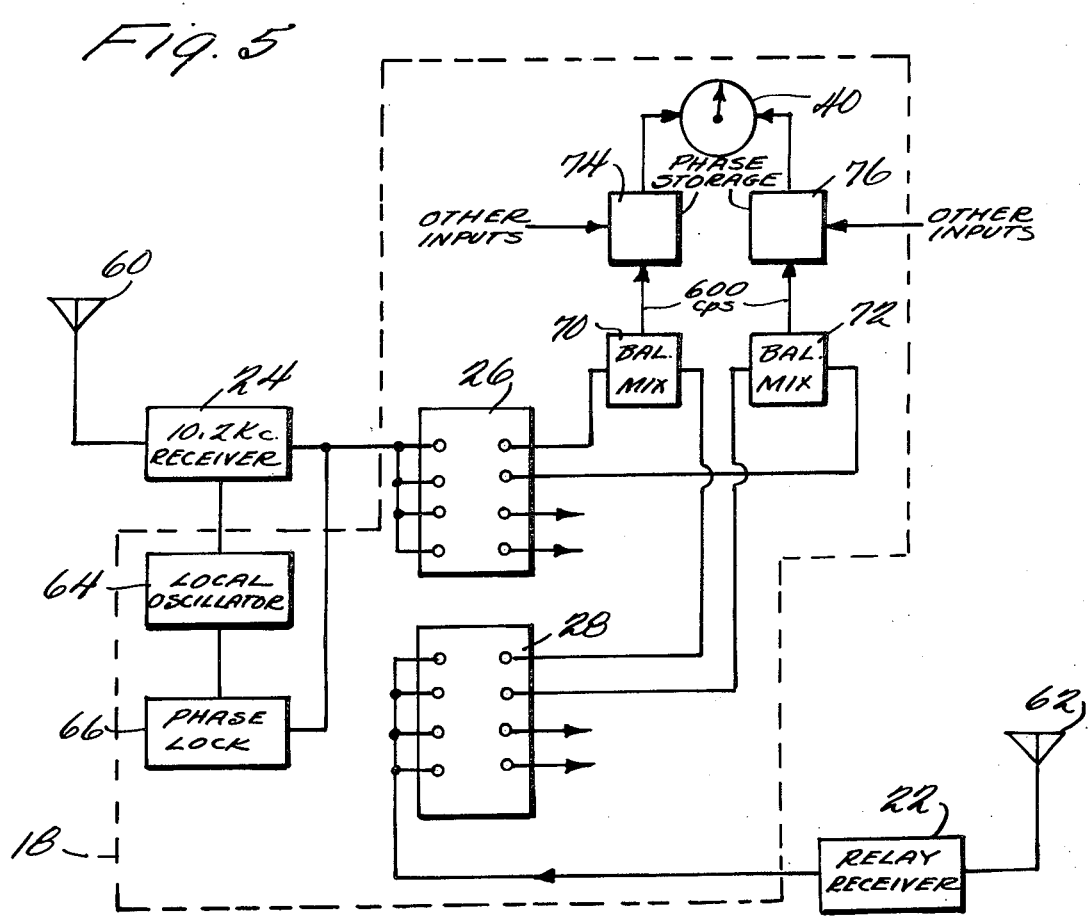
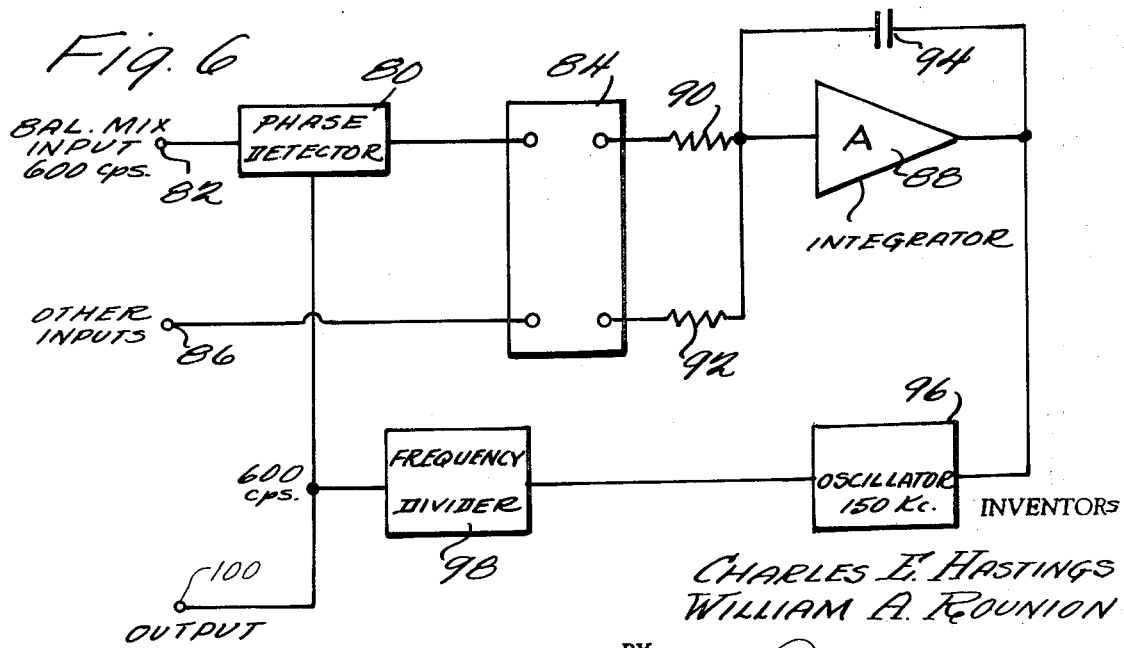

ISO-PHASE NAVIGATION SYSTEM

This application is a continuation in part of application Ser. No. 887,608, filed Dec. 23, 1969, which was itself a continuation in part of application Ser. No. 847,537, filed Aug. 1, 1969, and now abandoned.

This invention relates to navigation systems and more particularly to an improved Omega navigation system which overcomes the skywave problem of the prior art Omega navigation system.

There is a type of hyperbolic iso-phase line-of-position navigation system presently in use known as the Omega navigation system. The structure and operation of the Omega navigation system are described in an article by E. R. Swanson and M. L. Tibbals entitled: "The Omega Navigation System" in the *Journal of the Institute of Navigation*, Vol. 12, No. 1, Spring 1965, beginning at page 24 and in an article by M. L. Tibbals entitled: "Omega Applications on On-Station Positioning" in the *Journal of Institute of Navigation*, Vol. 13, No. 2, Summer 1966, beginning at page 134. When completed, the Omega navigation system will include eight transmitting stations located around the world, with each of these stations broadcasting very precisely phase controlled very low frequency signals of the frequencies 10.2 kHz, 11.3 kHz and 13.6 kHz in a predetermined signal format which repeats itself every 10 seconds. The particular transmitting station which is broadcasting at a given instant is identified by the length of the transmission of the particular frequency and the sequence of the transmission being broadcast by that particular station.

A mobile station, usually on board a ship, has a receiver tuned to one of the above mentioned frequencies, with the 10.2 kHz signal being the most common presently in use, which receives the signals being broadcast by the transmitting stations and which includes means for detecting the phases of the signals as received. Usually the mobile station operates only with regard to three selected transmitting stations. The mobile station receives signals broadcast from the first selected transmitting station, detects the phase of the signal so received and stores this information. The mobile station then receives the signals being broadcast by the second selected transmitting station, detects the phase of this signal and compares the phase with the phase previously detected from the first transmitting station. Comparing these phases gives the location of the mobile station along a first hyperbolic iso-phase line-of-position, in a manner well known to those skilled in the art. In a similar manner, the mobile station then receives signals being broadcast by the third selected transmitting station, detects the phase of these signals and compares the phase to that of one of the other two transmitting stations previously received and detected, thereby obtaining an line-of-position with regard to the third station and the other of the selected transmitting stations. The intersection of these two hyperbolic lines-of-position then gives the precise location of the mobile station.

From its earliest use in 1957, there has been recognized a serious problem which is inherent in the use of the Omega navigation system. This is the so-called "skywave effect." This skywave effect is caused by the variations in propagation through the earths atmosphere of radio frequency signals of the very low frequency range used in the Omega system. It is well known that the characteristics of the propagation of very low frequency signals vary throughout the day and that this diurnal variation itself varies throughout the year. Because of this variation, a fixed receiving station will receive signals of varying phase from a fixed transmitting station which is located far from the receiving station. Obviously a system such as the Omega navigation system which derives positional information as a function of the phase of a signal received at a location must find some means for compensating for these known propagation effects, or else the system will be so inaccurate as to be useless.

Two arrangements have been proposed in the prior art for overcoming this skywave effect. For example, in the above mentioned article entitled "The Omega Navigation System" it is proposed that the skywave effect be calculated for each point on earth for each day of the year and for various times throughout the day. Then a navigator on a ship receiving the Omega signals could refer to these calculations and make the necessary corrections from the received signals to determine his position accurately.

The disadvantages of this type of arrangement are obvious. First, the corrections would be no better than the calculations which went into them and obviously it would require a great deal of estimations and compromises to obtain such tables for so many variables as to time and place. Next, it requires a manual operation on the part of the navigator, and this obviates many of the advantages of any radio navigation system.

A second arrangement for compensating for the skywave effect which has been proposed is to provide a local relay station at a fixed point, in the vicinity of the mobile station which receives the signals transmitted by the transmitting stations, compares the phase of the signals with what should be their correct phase, and then transmits a correction which indicates to all mobile stations in the vicinity of the relay station what corrections must be made to compensate for the skywave effect. This type of correction system is based on the reasonably good assumption that the skywave effect between the transmitting stations and the relay station is substantially equal to the skywave effect between the transmitting stations and the mobile stations.

The obvious difficulty with this type of compensating arrangement is that it requires yet another receiving unit of a different type on the mobile station to receive the compensating information and again requires a manual operation on the part of the navigator to make the necessary corrections.

In accordance with the present invention, the above described skywave effect problem with Omega navigation systems is solved by providing a relay station at a fixed location. The relay station includes a receiver for receiving the signals being broadcast by the Omega transmitting stations and an arrangement for determining the phases of the signals thus received. The relay station also includes a transmitter for broadcasting a signal indicative of the phase of the signals as received at the relay station. The mobile station in the system is provided with a first receiver for receiving the signals broadcast by the Omega transmitting stations, in a conventional manner, and a second receiver for receiving the signals broadcast by the relay station. The mobile station also includes means for determining the phase of the signals received by its first receiver relative to the phase of the signals received by its second receiver, and thereby determines its position relative to the Omega transmitting stations, independent of its distance from the relay station.

For a complete understanding of the invention, refer to the attached drawings and the following description of these drawings, in which:

FIG. 5 is a block diagram of a second embodiment of the mobile station used with the invention; and FIG. 6 is a detail of a portion of the mobile station of FIG. 5.

Figure 1:
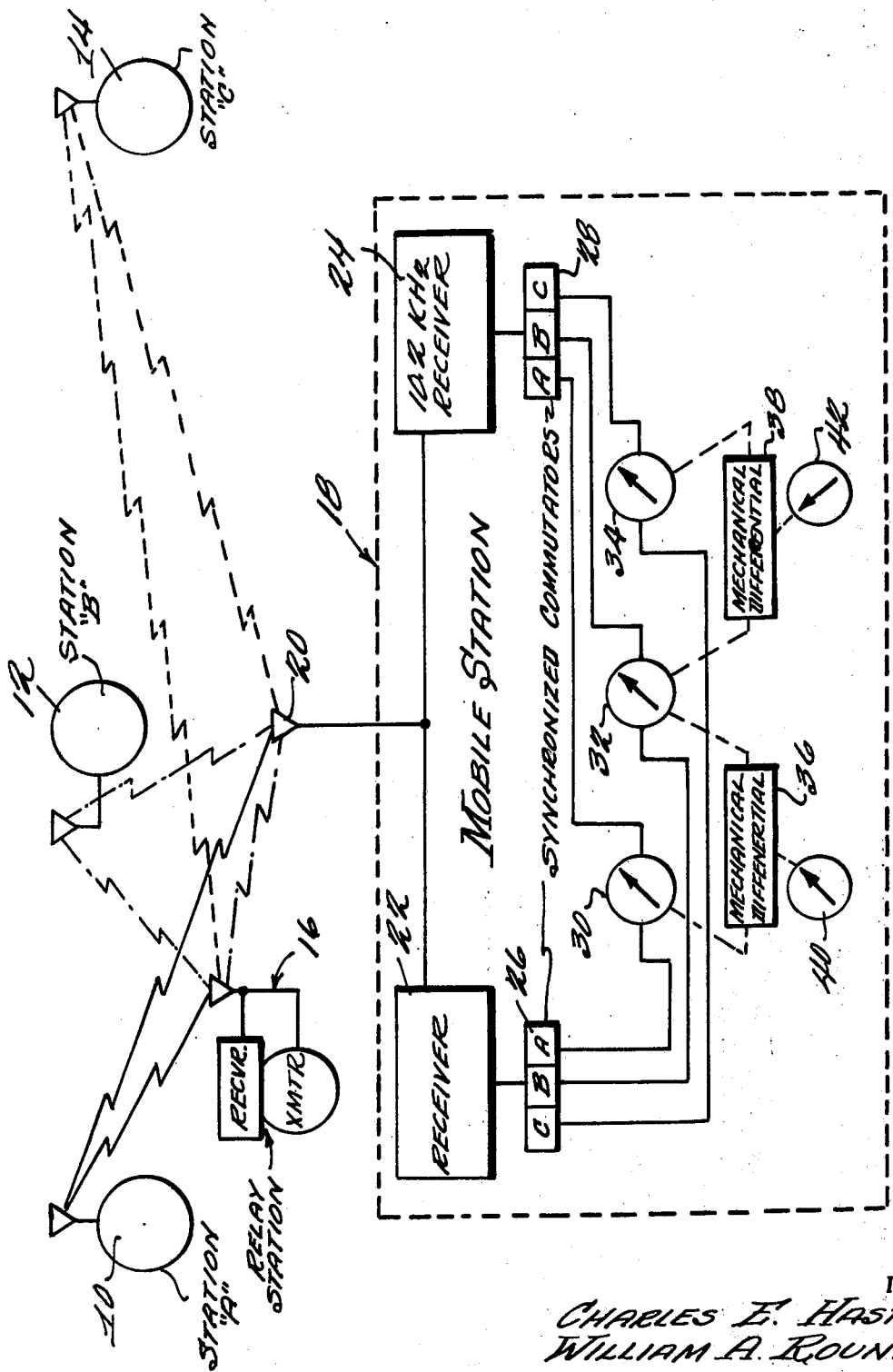
FIG. 1 is a block diagram of one embodiment of the invention.

Referring now to FIG. 1, therein is shown a block diagram of a hyperbolic iso-phase line-of-position navigation system in accordance with the present invention. As shown therein, the system utilizes three transmitter stations 10, 12 and 14, which are designated stations A, B and C respectively, which are transmitting stations at known fixed locations in the Omega navigation system. Each of these stations broadcasts very low frequency signals of predetermined frequencies and precisely controlled phase in a predetermined time sequence which repeals itself every 10 seconds.

In accordance with the present invention, a relay station 16 is provided at a fixed location which is in the general vicinity of a mobile station 18 whose position is to be determined. Preferably, relay station 16 is located within 100 miles of the position of mobile station 18, which may typically be 3,000 to 6,000 miles from at least two of the transmitting stations 10, 12 and 14.

Relay station 16 includes a receiver for receiving all of the signals broadcast by transmitting stations 10, 12 and 14. As is described in more detail in the subsequent figures, the relay station 16 also includes means for deriving a phase reference signal whose phase is the same as the phase of the signals as received at relay station 16, and means for transmitting this phase reference signal to the mobile station 18. Preferably, the phase reference signal is modulated in any suitable manner onto a carrier frequency of substantially higher frequency than the signals being broadcast by transmitting stations 10, 12 and 14. It has been found satisfactory to modulate the phase reference signal by single sideband modulation onto a carrier frequency of 1,750 kHz.

Mobile station 18 is typically carried aboard a ship whose location is to be determined. Mobile station 18 includes an antenna 20 which receives the signals broadcast by transmitting stations 10, 12 and 14 and by relay station 16, and is connected to two receivers 22 and 24. Receiver 22 is tuned to the carrier frequency of the transmitter of relay station 16 and includes suitable demodulation apparatus for recovering the phase reference signal which was modulated onto the carrier of the transmitter of relay station 16. The output of receiver 22 is now the phase reference signal whose phase is shifted by an amount which is a function of the distance between relay station 16 and mobile station 18.

Receiver 24, which also receives the output of antenna 20, is tuned directly to the selected frequency being broadcast by transmitting stations 10, 12 and 14.

In the preferred embodiment, receiver 24 is tuned to receive the 10.2 kHz signals broadcast by the transmitting stations 10, 12 and 14. Receiver 24 also includes means for deriving an output signal whose phase is the same as the phase of the signals as received at mobile station 18 and whose frequency is the same as the phase reference signal generated at relay station 16, so that the output signal of receiver 24 can be directly compared to the output signal from receiver 22. Apparatus for deriving such an output signal from receiver 24 is described in more detail below in connection with the description of the other figures.

The output from each of the receivers 22 and 24 is applied to the input of a respective synchronous commutator 26 and 28, each of which is driven synchronously with the sequential format in which transmitting stations 10, 12 and 14 transmits the signal of 10.2 kHz. The outputs of the receivers 22 and 24 are connected through sections A of the synchronous commutators 26 and 28 whenever station 10 is transmitting, through sections B of synchronous commutators 26 and 28 whenever station 12 is transmitting and through sections C of synchronous commutators 26 and 28 whenever station 14 is transmitting.

Three phase meters 30, 32 and 34 are connected as shown, with phase meter 30 being connected between section A of synchronous commutator 26 and section A of synchronous commutator 28, phase meter 32 being connected between section B of synchronous commutator 26 and section B of synchronous commutator 28, and phase meter 34 being connected between section C of synchronous commutator 26 and section C of synchronous commutator 28. The phase meters 30, 32 and 34 thus show the relative phases of the signals received at mobile station 18 directly from transmitting stations 10, 12 and 14 and the phases of the signals received from the same transmitting stations as relayed through relay station 16.

In accordance with the present invention, it is assumed that the skywave effect is essentially the same between a given transmitting station and the relay station 16 as it is between the same transmitting station and mobile station 18. Accordingly, the skywave effect is the same in receivers 22 and 24 and is cancelled out by the phase comparison in the meters 30, 32 and 34. The effect of the distance between relay station 16 and mobile station 18 is cancelled out by comparing the readings of phase meters 30 and 32 to obtain a first hyperbolic iso-phase line-of-position relative to transmitting stations 10 and 12 and by comparing the readings of phase meters 32 and 34 to obtain a second hyperbolic iso-phase line-of-position relative to transmitting stations 12 and 14. In accordance with the embodiment of the invention shown in FIG. 1, these comparisons are made by two differential resolvers 36 and 38. Differential resolver 36 receives shaft inputs from phase meters 30 and 32 and electrically drives a phase meter 40 which shows the difference in the readings of the phase meters 30 and 32. Since the reading of these two phase meters 30 and 32 are responsive in the same degree to the distance between relay station 16 and mobile station 18, it is seen that this differential reading cancels this factor out, and the reading of phase meter 40 is not a function of the distance between relay station 16 and mobile station 18. Similarly, assuming that the skywave effect is the same between a given transmitting station and relay station 16 as it is between the same transmitting station and mobile station 18, the skywave effect is cancelled out in the two phase meters 30 and 32 and again the phase meter 40 showing the differential reading which cancels out the distance between relay station 16 and mobile station 18 and gives a reading which is not affected by either this distance or the skywave effect. Thus, phase meter 40 gives a reading which determines a hyperbolic iso-phase line-of-position between transmitting stations 10 and 12.

In a similar manner, phase meter 42, giving the differential reading between phase meters 32 and 34, gives a reading from which can be derived a hyperbolic iso-phase line-of-position between transmitting stations 12 and 14 and which is not a function of the distance between relay station 16 and mobile station 18 or a function of the skywave effect at that time.

At this point it is noted that while the readings of differential phase meters 40 and 42 are independent of the distance between relay station 16 and mobile station 18, they are not independent of the location of relay station 16. Thus, while the readings can be used directly to obtain relative position information, if it is desired to use the standard Omega overlay charts to obtain absolute position, it is necessary to make a suitable compensation for the location of relay station 16. It has been found that the easiest way to do this is to compensate for it empirically. This is done by making a suitable adjustment in either the phase meters in mobile station 18 or in the phase of the phase reference signal as broadcast by the transmitter in relay station 16 at a time when the mobile station is in a known location, such as when the ship carrying it is in a known port, so that phase meters 40 and 42 give a correct output reading for that port location. Thus, all readings thereafter will be absolute readings independent of the location of relay station 16, of the distance between relay station 16 and mobile station 18, and of the skywave effect between the transmitting stations 10, 12 and 14 and mobile station 18.

Figure 2:
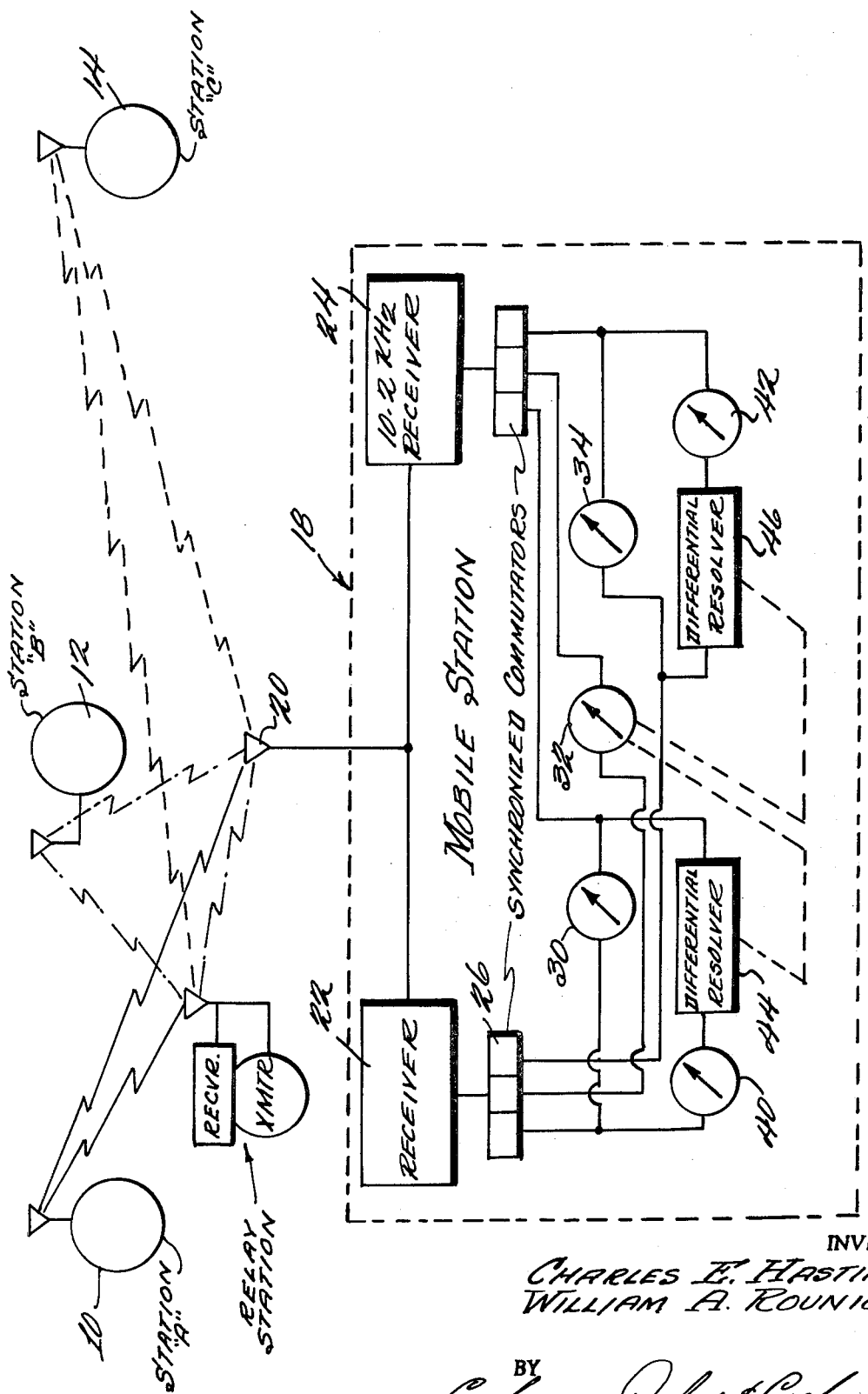
FIG. 2 is a block diagram of a second embodiment of the invention.

FIG. 2 shows a block diagram of a second embodiment of the present invention. In this embodiment, differential resolver 44 is used as a variable phase shifter to provide phase meter 40 with the differential reading between phase meters 30 and 32. Phase meter 40 and differential resolver 44 are connected as shown, with differential resolver 44 receiving a shaft input from phase meter 32. Phase meter 40 thus gives a reading which is equal to the difference in the readings of phase meters 30 and 32 and a hyperbolic iso-phase line-of-position with regard to transmitting stations 10 and 12 is thus obtained. Phase meter 42 and differential resolver 46 are similarly connected between phase meters 32 and 34 to provide a hyperbolic iso-phase line-of-position between transmitting stations 12 and 14.

Figure 3:
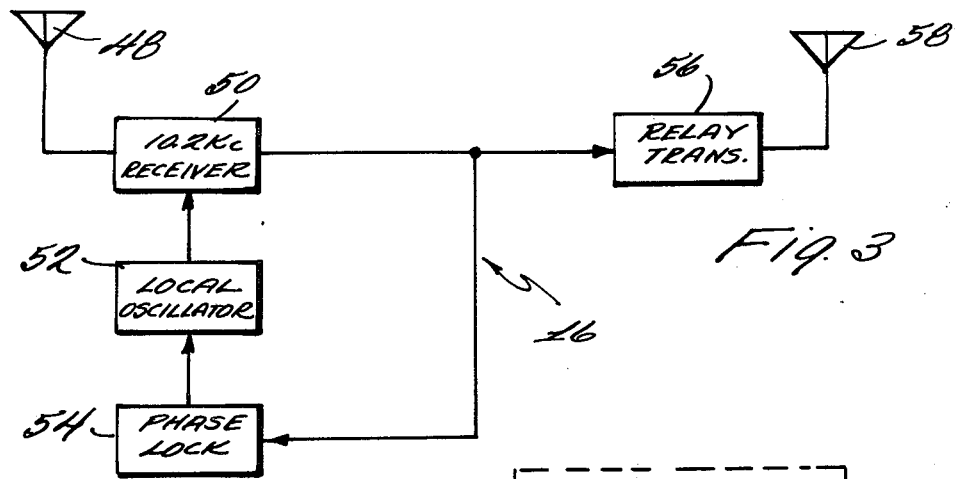
FIG. 3 is a block diagram of the relay station used in FIGS. 1 and 2.

FIG. 3 shows a block diagram of the relay station 16 of FIGS. 1 and 2. The station includes an antenna 48 for receiving the signals being broadcast by transmitting stations 10, 12 and 14 and a receiver 50 which is tuned to the selected frequency being broadcast by transmitting stations 10, 12 and 14. For example, in the preferred embodiment, receiver 50 is tuned to receive the 10.2 kHz signals being broadcast by transmitting stations 10, 12 and 14. Relay station 16 also includes a local oscillator 52 which generates a signal which is heterodyned with the signal received by receiver 50 to generate a phase reference signal whose phase is a function of the phase of the signals as received from transmitting stations 10, 12 and 14 at mobile station 16. In the preferred embodiment of the invention, the frequency of local oscillator 52 is 10.5 kHz, which, when heterodyned with the signals received from transmitting stations 10, 12 and 14 gives a phase reference signal having a frequency of 300 Hz and having a phase which is a function of the phase of the signals as received at relay station 16.

The phase of the local oscillator 52 is controlled by a conventional phase lock 54 of a type well known to those skilled in the art which locks the phase of local oscillator 52 to the phase of a selected one of the transmitting stations 10, 12 and 14. For example, local oscillator 52 might arbitrarily be phase locked to the signals being broadcast by transmitting station 14.

Figure 4:
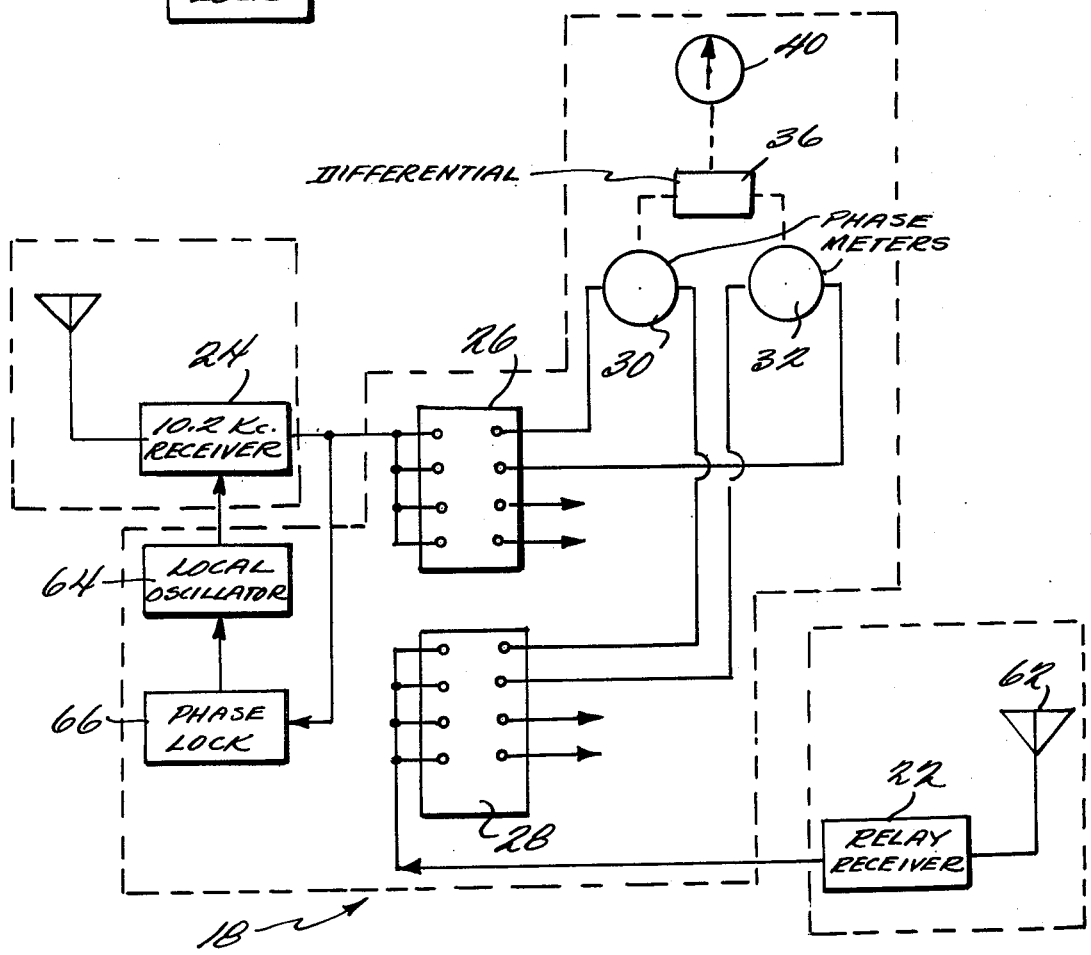
FIG. 4 is a block diagram of one embodiment of the mobile station used with the invention.

FIG. 4 shows a block diagram of another embodiment of the mobile receiver 18 and also illustrates how the signals received directly from transmitting stations 10, 12 and 14 are converted into signals which can be directly compared to the signals received from relay station 16. The mobile station 18 shown in FIG. 4 differs from the one shown in FIG. 1 in that the receivers 22 and 24 are each provided with their own respective antennas 62 and 60. Mobile station 18 includes a local oscillator 64 whose output is heterodyned with the 10.2 kHz signal received by receiver 24. The frequency of local oscillator 64 is selected such that the heterodyne signal is equal in frequency to the phase reference signal of the relay station 16 of FIG. 3. Again, in the preferred embodiment, the frequency of this local oscillator 64 is also 10.5 kHz, the same as the frequency of local oscillator 52 of relay station 16, and a conventional phase lock 66 is provided to lock the phase of local oscillator 64 to the same one of the transmitting stations to which local oscillator 52 of relay station 16 is locked. If local oscillator 52 is phase locked to transmitting station 14, local oscillator 64 of the mobile station 18 is also phase locked to transmitting station 14.

The output signal of receiver 24 is thus now a signal whose frequency and phase can be directly compared to the output signal from receiver 22, which receives and demodulates the phase reference signal from relay station 16. The output signals of receivers 22 and 24 are then applied through synchronous commutators 26 and 28 respectively to phase meters 30 and 32 which, through differential resolver 36, provide a differential phase reading to phase meter 40 to provide a first hyperbolic iso-phase line-of-position with respect to transmitting stations 10 and 12, in the manner described in more detail in connection with FIG. 1 above. In a similar manner, not shown in FIG. 4, the other outputs from synchronous commutators 26 and 28 are applied to other phase meters to provide an additional hyperbolic iso-phase line-of-position with respect to another pair of the transmitting stations 10, 12 and 14.

FIG. 5 shows a block diagram view of yet another embodiment of the mobile receiver 18 which is quite similar to the embodiment of FIG. 4 except that the phase meters 30 and 32 and the differential resolver 36 have been replaced by electronic circuits for performing the same functions as was performed by the phase meters and the differential resolver. As shown in FIG. 5, a pair of balanced mixers 70 and 72 are connected between the synchronous commutators 26 and 28. These balanced mixers serve as phase summing devices which have an output signal whose frequency is equal to the sum of the frequencies of the input signals and whose phase is equal to the sum of the phases of the input signals. Thus, in this shown embodiment, the balanced mixers 70 and 72 each have an output signal of 600 Hz and have phases equal to the sum of the phases of the signals received directly from transmitting stations 10, 12 and 14 and from relay station 16. The output signals from balanced mixers 70 and 72 are applied to phase storage circuits 74 and 76 respectively and again phase meter 40 provides a differential reading between phase storage circuits 74 and 76 to provide the hyperbolic iso-phase line-of-position between transmitting stations 10 and 12, in the manner described in FIG. 1 above. In this embodiment, the phase storage circuits 74 and 76 may also receive other inputs from additional devices, such as computers or inertial navigation systems (neither of which is shown), to update the positional information between the ten second intervals at which the transmitting stations transmit.

FIG. 6 shows details of a suitable phase storage circuit 74 such as is shown in block diagram form in FIG. 5. As shown therein, the phase storage circuit includes an input terminal 82 which receives the input signal from the balanced mixer 70, another input terminal 86 which receives the other inputs, such as from the computer or inertial navigation system mentioned in FIG. 5, and an output terminal 100 which is attached to the phase meter 40 of FIG. 5.

The key element of the phase storage circuit 74 is the voltage controlled oscillator 96 which, as is described below, is maintained at a phase which is a function of the phase of the signal applied to input terminal 82 even after the signal is removed from input terminal 82.

Phase detector 80, an integrator circuit consisting of an amplifier 88, a resistor 90 and a capacitor 94, and a frequency divider network 98 are connected as shown in FIG. 6. The output of the frequency divider network 98 is connected to the phase detector 80 and to the output terminal 100. The voltage controlled oscillator 96 has a free running frequency which is a multiple of the 600 Hz signal which is applied to input terminal 82 when the synchronous commutators 26 and 28 are in the proper positions to energize this portion of the mobile station. For example, in the preferred embodiment of the invention, the voltage controlled oscillator 96 has a free running frequency of 150 kHz, which is stepped down by frequency divider network 98 to 600 Hz. The phases of the signal applied to input terminal 82 and the output signal of frequency divider network 98 are compared in phase detector 80, and if there is any difference in the phases of these two signals, an output signal is supplied by phase detector 80 to the integrator network, whose output is the voltage which controls the voltage controlled oscillator 96. The output signal from the integrator circuit, if any output signal does exist, adjusts the phase of voltage controlled oscillator 96 until the phase of the output signal of frequency divider network 98 is the same as the phase of the signal on input terminal 82, at which time the output signal of phase detector 80 is zero, and voltage controlled oscillator 96 continues running at this phase and frequency even if the input signal is removed from input terminal 82. A signal of the proper phase is thus maintained on output terminal 100 until an additional input signal is provided into the circuit. This additional input signal may be provided either by synchronous commutators 26 and 28 on their next cycle, or it may be provided through the other input terminal 86, which is also connected to the integrator circuit through resistor 92, to provide any desired positional update information during the ten second Omega transmitting cycle.

While the invention is thus disclosed and several specific embodiments described in detail, it is not intended that the invention be limited to the particular shown embodiments. Instead, many modifications will occur to those skilled in the art which lie within the spirit and scope of the invention. It is thus intended that the invention be limited in scope only by the appended claims.

What is claimed is:

1. In a hyperbolic iso-phase line-of-position navigation system for determining the location of a mobile station in which at least three transmitter stations are located at known fixed locations and sequentially broadcast signals of a predetermined frequency in a predetermined time sequence, the improvement comprising:

a relay station comprising means for receiving signals broadcast by said transmitter stations and means for transmitting a signal whose phase is indicative of the phase of the signals as received at said relay station from said transmitter stations, a first receiver located on said mobile station comprising means for receiving signals broadcast by said transmitter stations, a second receiver located on said mobile station comprising means for receiving the signal transmitted by said relay station, three phase comparison means each corresponding to a respective one of said three transmitter stations for determining the phase of the signals received by said first receiver relative to the phase of the signal received by said second receiver, first output means for comparing the phase of said first and second phase comparison means, thereby determining a location along a first line-of-position relative to said first and second transmitter stations, and second output means for comparing the phases of said second and third phase comparison means, thereby determining a location along a second line-of-position relative to said second and third transmitter stations.

2. The invention of claim 1 which further comprises synchronous means synchronized with the predetermined time sequence in which said three transmitter stations broadcast for connecting each of said three phase comparison means to said first and second receivers whenever its respective transmitter station is broadcasting.

3. The invention of claim 2 in which said relay station further comprises a local oscillator having a known frequency different from said predetermined frequency, phase locking means for locking the phase of said local oscillator with the phase of a predetermined one of said transmitter stations, and means for mixing the output signal of said local oscillator with the signals received from said transmitter stations, thereby obtaining a first heterodyne signal whose phase is the same as the phase of the signals from said transmitter stations as received at said relay station.

4. The invention of claim 3 in which said means for transmitting a signal in said relay station comprises means for generating a carrier signal, means for modulating said heterodyne signal onto said carrier signal and means for transmitting the resultant modulated carrier signal.

5. The invention of claim 4 in which said first receiver includes a local oscillator having a known frequency different from said predetermined frequency, phase locking means for locking the phase of said local oscillator with the phase of said predetermined one of said transmitter stations, and means for mixing the output signal of said local oscillator with the signals received from said transmitter stations, thereby obtaining a second heterodyne signal whose phase is the same as the phase of the signals from said transmitter stations as received at said mobile stations.

6. The invention of claim 5 in which the fixed frequency of said local oscillator in said relay station is the same as the fixed frequency of said local oscillator in said first receiver, whereby the frequencies of said first and second heterodyne signals are the same.

7. Mobile receiving means for use in a hyperbolic isophase line-of-position navigation system for determining the location of a mobile station carrying said mobile receiving means in which at least three transmitter stations are located at known fixed locations and sequentially broadcast signals of a predetermined frequency in a predetermined time sequence and which includes a relay station for receiving signals broadcast by said transmitter stations and for transmitting a signal whose phase is indicative of the phase of the signals as received at said relay station from said transmitter stations, said mobile receiving means comprising:

a first receiver including means for receiving signals broadcast by said transmitter stations, a second receiver including means for receiving the signal transmitted by said relay station, three phase comparison means each corresponding to a respective one of said three transmitter stations for determining the phase of the signals received by said first receiver relative to the phase of the signal received by said second receiver, first output means for comparing the phases of said first and second phase comparison means, thereby determining a location along a first line-of-position relative to said first and second transmitter stations, and second output means for comparing the phases of said second and third phase comparison means, thereby determining a location along a second line-of-position relative to said second and third transmitter stations.

8. The invention of claim 7 which further comprises synchronous means synchronized with the predetermined time sequence in which said three transmitter stations broadcast for connecting each of said three phase comparison means to said first and second receivers whenever its respective transmitter station is broadcasting.

* * * * *